United States Patent [19]

Fuller

[11] 3,975,074

[45] Aug. 17, 1976

[54] STANDING BOX FOR ELECTRICAL FIXTURES

[75] Inventor: Alvin Walter Fuller, Shelton, Conn.

[73] Assignee: Harvey Hubbell Incorporated, Orange, Conn.

[22] Filed: Apr. 4, 1975

[21] Appl. No.: 565,052

[52] U.S. Cl. ............................. 339/89 R; 220/3.5; 339/94 A; 339/130 C
[51] Int. Cl.² ................... H01R 13/54; H02G 3/08
[58] Field of Search ............... 174/48, 49; 220/3.3, 220/3.5, 3.7, 3.94; 339/44, 89, 94, 122, 129, 130, 159

[56] References Cited
UNITED STATES PATENTS

| 1,965,087 | 7/1934 | Sharp | 339/89 R |
|---|---|---|---|
| 2,436,217 | 2/1948 | Locktov | 339/89 R |
| 2,659,060 | 11/1953 | Cohane | 339/89 R |

FOREIGN PATENTS OR APPLICATIONS

| 458,966 | 4/1928 | Germany | 339/89 R |
|---|---|---|---|
| 1,249,374 | 9/1967 | Germany | 174/48 |

Primary Examiner—Granville Y. Custer, Jr.
Assistant Examiner—Neil Abrams
Attorney, Agent, or Firm—Jerry M. Presson

[57] ABSTRACT

Disclosed is a standing box incorporating electrical convenience outlets and adapted for selective electrical and mechanical connections to a floor box. The standing box is made as a single integral structure which facilitates both types of connections to an electrical wiring device, such as an electrical receptacle, mounted in the floor box. The mechanical connection utilizes an annular sealing gasket which compresses with little or no disruptive torsional displacement when the connection is effected. The standing box presents a relatively low silhouette and hence a relatively small obstruction to surrounding floor surfaces.

3 Claims, 6 Drawing Figures

STANDING BOX FOR ELECTRIAL FIXTURES

This invention relates to a new and improved electrical standing box unit for providing selective electrical and mechanical connections to an electrical convenience outlet in a floor box unit.

A combination of floor and standing box units of which we are aware allows electrical and mechanical connection and disconnection of the standing box unit to and from the floor box unit to meet the electrical requirements of a given floor area in which there may be a plurality of recess-mounted floor boxes. In such combination, it is also conventional to seat gaskets in the floor boxes to seal the standing box from entry of dirt and other solid extraneous matter when the floor and standing boxes are joined together. In addition, the gasket serves to seal the mating electrical parts of the two units from contact with liquids such as surface water, which could disrupt the electrical circuit between the two units. The gasket is typically mounted against a flange at the bottom of an internally threaded, annular floor ring member, secured to the floor box flush with the floor surface. To join the standing box unit to the floor box unit, the prior art employs an externally threaded hollow extension nut which threadedly connects to that ring member and thereby provides an upright support for the standing box.

With this prior art arrangement however, the lowermost end of the extension nut physically contacts and bears against the uppermost surface of the gasket mounted in the floor box. Thus, as the extension nut is rotated into the floor ring, the rotation of the nut against the gasket imparts torsional stresses into the gasket which breaks down the capability of the gasket to effectively seal the connection against entry of moisture and dirt.

Moreover, with this prior art arrangement, the standing box unit includes a hollow cylindrical stem housing an electrical wiring device, typically an electrical plug, which is to be inserted into an appropriate mating wiring device, typically an electrical receptacle, mounted in the floor box unit. The lower end of the stem is provided with a threaded collar which threadedly connects to an externally threaded upper end of the extension nut. The wiring device, though housed in the stem of the standing box, is easily removable from the stem and is electrically connected by means of extendible insulated leads or conductors to a convenience outlet in the standing box unit. These leads are sufficiently long so that the electrical wiring device housed in the standing box may be pulled out of the stem and inserted into the mating wiring device in the floor box before the stem of the standing box is physically connected to the extension nut. Conversely, upon removal of the standing box from the extension nut, the wiring device in the stem is subsequently detached from its connection with its mating wiring device in the floor box.

One disadvantage of this arrangement is that because the wiring device housed in the stem of the standing box is removed from the stem to insert it in the floor box receptacle, the leads which extend from the bottom of the standing box stem may have protective insulation frayed by rubbing against the lowermost open end of the stem during attachment and removal of the wiring device to and from its associated wiring device in the floor box unit. Under severe use conditions, this fraying may result in removal of the insulation around the leads and in short circuits developing between contacting, non-insulated conductors. Moreover, if the wiring device in the standing box is required to be passed through the extension nut to connect with the floor receptacle, there may not be sufficient open area around the plug to permit easy, manual insertion and removal from the receptacle.

Another disadvantage with this type of prior art standing box is that use of an extension nut to mount the standing box increases the overall height of the standing box unit. As a result, the standing box may present a substantial impediment on the floor surface.

This invention has as its objective, a provision of a new and improved electrical standing box unit which avoids the abovementioned disadvantages of prior art standing box units.

Another object of this invention is a new and improved standing box which is an integral unit adapted for selective electrical and mechanical connection to an appropriate floor box unit.

Another object is to provide a standing box unit which utilizes a sealing gasket for sealing the standing box unit in its mounting on a floor box unit against entry of extraneous matter and wherein the standing box imparts only compressive forces to the gasket thereby increasing its effective life.

Yet another object of this invention is to provide a standing box unit which presents a low silhouette with respect to the surface on which it is mounted.

In accordance with one embodiment of the instant invention, there is disclosed an integral standing box unit housing an electrical device, typically a convenience receptacle outlet, for making both selective electrical and mechanical connections to an electrical device, also typically a receptacle, in a floor box. The electrical connection is completed through an electrical wiring device, typically an electrical plug, mounted in a hollow stem support for the standing box; the plug mating with the receptacle in the floor box and being electrically connected to the convenience outlet. The connection is made electrically selective by means of the mating electrical wiring devices mounted in the standing and floor boxes, respectively. A selective mechanical connection is effected between the two boxes by means of an externally threaded locking ring carried around the stem which supports the standing box upright above floor level and by fixedly mounting the plug in the stem and the receptacle in the floor box. The floor box end of the stem includes an annular flange which lies in essentially the same plane as the planar front surface of the wiring device inserted in the standing box. The flange serves to retain an externally threaded locking ring and also provides a nonrotating surface for compressing axially an annular gasket recess-mounted in the floor box. The gasket serves to seal the two boxes against entry of liquid and extraneous solid matter. By fixedly mounting the plug in the stem, the standing box is made a fully integral unit in that it carries with it all parts necessary for making selective mechanical and electrical connections to a suitable floor box unit. In addition, since the wiring device is fixed to the stem of the standing box and the stem is fixed to the standing box, the latter, because it provides an elongated head structure which may be grasped, facilitates the manual insertion and removal of the plug in and from its mating receptacle in the floor box.

BRIEF DESCRIPTION OF THE DRAWINGS

The manner in which these and other objects of the invention are achieved will be best understood by reference to the following description, the appended claims, and the attached drawings wherein:

DESCRIPTION OF THE PREFERRED EMBODIMENTS

Figure 1:
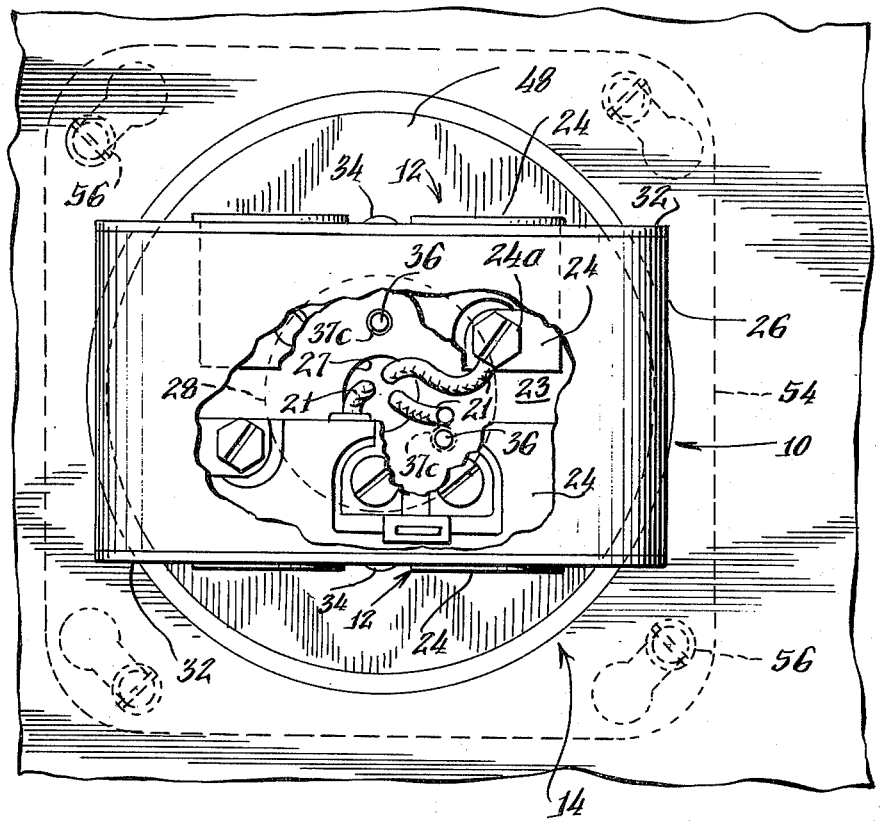
FIG. 1 is a plan view of a floor box unit and a standing box unit constructed in accordance with this invention with a portion of the standing box unit cut away to illustrate the interior thereof.
Figure 2:
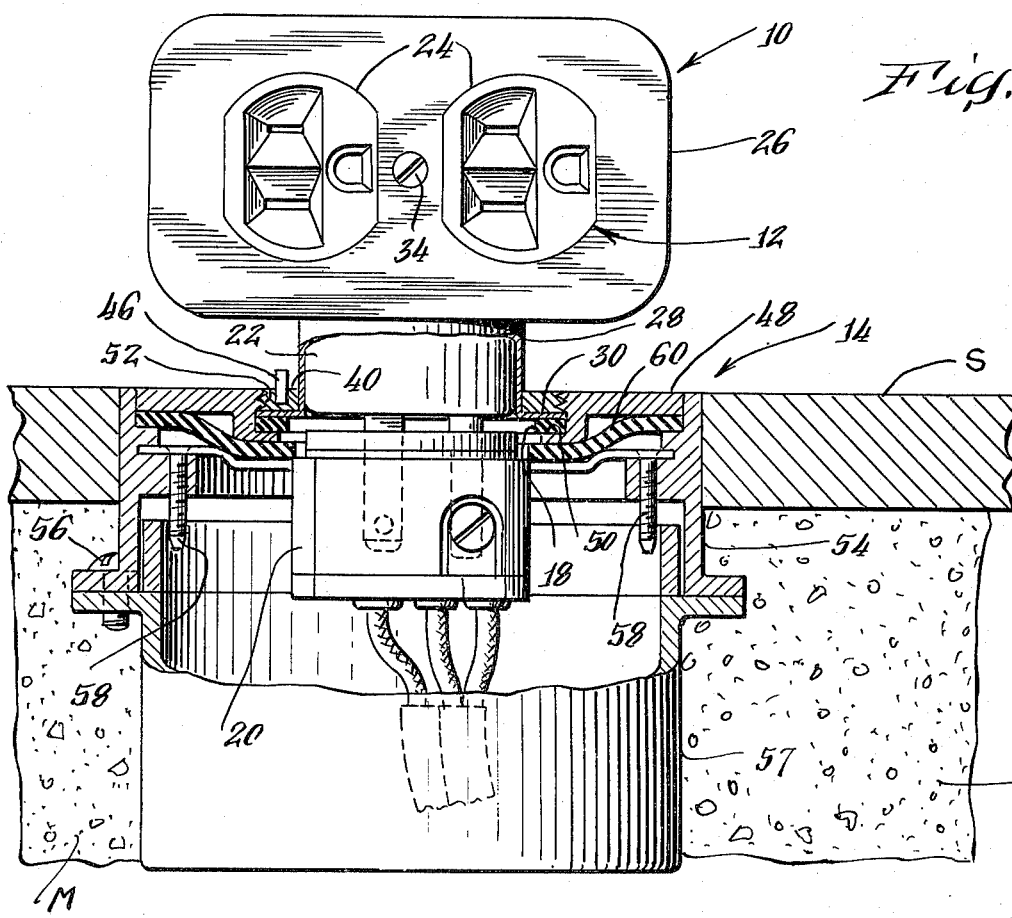
FIG. 2 is a front elevational view of FIG. 1 with portions cut away to better illustrate the mechanical and electrical connections between the two units.
Figure 3:
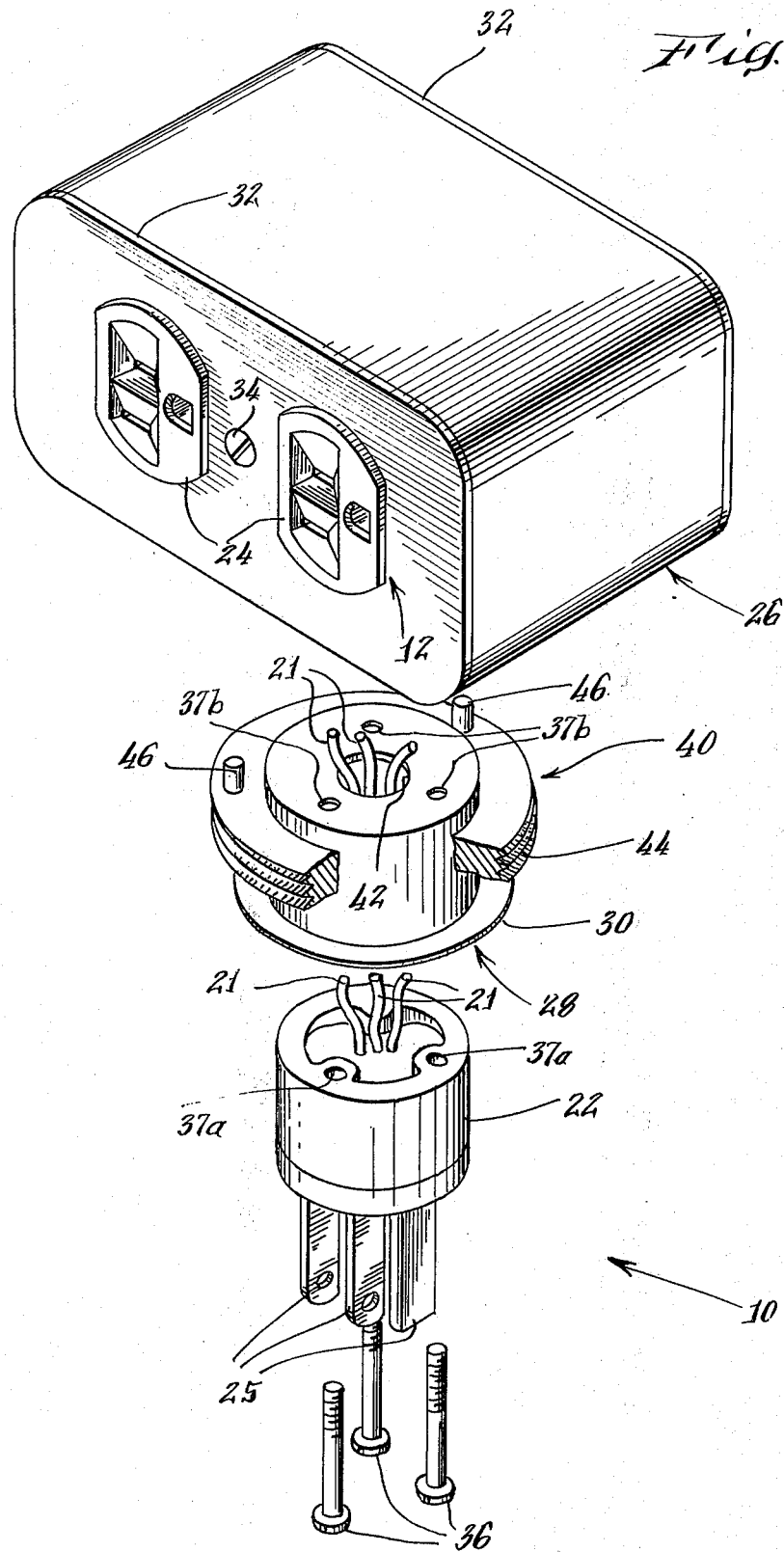
FIG. 3 is an exploded view of the standing box unit showing various members which comprise that box.

One embodiment of a standing box unit 10 for convenience outlets 12 constructed in accordance with the principles of this invention is illustrated in FIGS. 1–3, inclusive. The unit 10 is mechanically connected to floor box unit 14 and an electrical connection also effected between the two units by means of mutually compatible conventional wiring devices, for example, an electrical receptacle 20 and an electrical plug 22. A gasket 18 is seated in the unit 14 for sealing the region between the plug and receptacle against entry of surface water, dirt and other extraneous liquid or solid matter. As will be evident, either the plug or the receptacle could be mounted on the standing box unit 10 with the other mounted on the floor box unit 14, depending upon the particular application and solely for exemplary purposes, the plug 22 is described hereinafter as mounted on the standing box unit and the receptacle 24 mounted on the floor box unit. Furthermore, the standing box unit 10 could be structured for any number or type of convenience outlet 12. To simplify this description, a pair of female dual receptacles 24 are illustrated.

The wiring devices 12 are electrically connected to the plug 22 by a plurality of insulated electrical conductors 21 equal in number to the number of plug prongs 25 to which the conductors are individually connected. The receptacles 24 are electrically connected by means of the conductors 21 to the receptacle 20 when the standing box unit 10 is mechanically connected to the floor box unit 14.

Included in the structure of the standing box unit 10 is a head 26 for housing the electrical wiring devices 12 and a hollow cylindrical stem 28. The stem is fixedly attached at the upper end thereof to the bottom casing wall 23 of the unit 10 perpendicular thereto, as by welding, and the longitudinal axis of the stem is in coalignment with the center of a circular opening 27, FIG. 1, formed in that wall centrally thereof. An annular flange 30 is formed on the lower end of the stem 28 by, for example, upsetting that end and extends outwardly, perpendicularly to the longitudinal axis of the stem. The lower end of the stem 28 recesses the plug 22 as shown in FIG. 2 with a slight tolerance. The head 26 includes end plates 32 which are cut out to accommodate the receptacles 24. The plates 32 are affixed by screws 34 which pass through screw hole openings in each end plate 32.

With reference to FIG. 3, screws 36 fixedly attach the plug 22 in the stem 28 passing through three concentric, equi-spaced longitudinal bores 37a in the plug 22 arranged outwardly of the plug prongs 25 and concentric bores 37b in end plate 39 in the stem 28 to engage three respectively concentric threaded apertures 37c, FIG. 1, formed in the bottom casing wall 23 of the head 26. The stem 28 is joined to the head 26 by the screws 36 and an annular locking collar 40 having an internal diameter smaller than the outer diameter of the flange 30 and of also a considerably less size than that of the bottom wall 23 is thereby retained on the stem 28 in the region of the stem between the head 26 and the flange 30. The opening 27, FIG. 1, communicates with the end 39 of the stem 28 and is concentric with the longitudinal axis of the plug 22 to provide a continuous open channel for the electrical conductors 21 to pass from electrical contacts, such as 24a, on the receptacles 24 to corresponding electrical contacts of the prongs 25. The collar 40 is configured to circumscribe the stem 28 with a small rotational clearance therebetween and includes a circular shoulder portion which bears against the peripheral flange 30. The collar is externally threaded, as shown at 44, to threadedly engage threads 52 of a floor plate 48. If desired, means for facilitating rotation of the locking collar 40 may also be provided on the collar, such as pins 46 which can be gripped by a wrench of suitable design.

It will be recognized that the device 22, the stem 28 and the head 26 form an integral, unitary structure and the leads connecting the electrical contacts of the plug 22 to the electrical contacts of the receptacles 24 are enclosed and protected by the stem at all times. This arrangement allows the plug 22 to be inserted in and removed from the receptacle 20 by grasping and manipulating the head 26 of the standing box unit 10. In addition, with the collar 40 retained by the casing 26 and the flange 30, there is practically no chance that the collar 40 will be lost or misplaced after removal of the standing box unit from the floor box unit. Moreover, the leads in the stem 28 remain protected at all times and are not subject to tensile forces or fraying.

Figure 4:
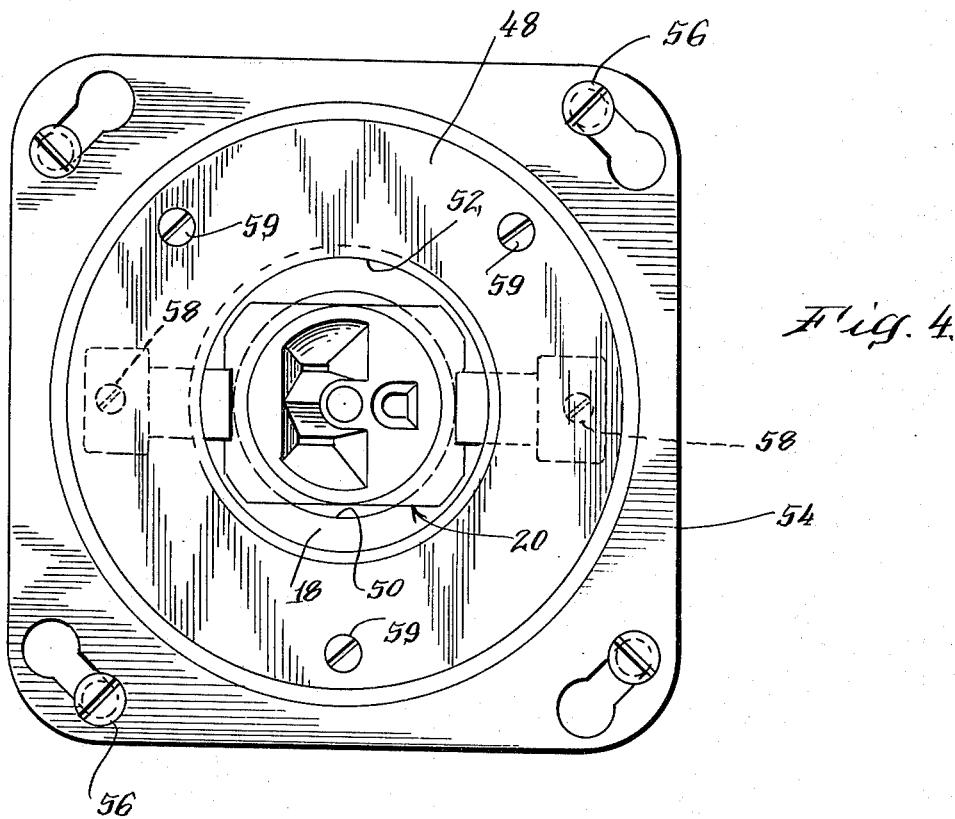
FIG. 4 is a plan view of the floor box unit.

A face plate 48 of generally circular shape is in a conventional floor box unit 14 embedded in a matrix M which is typically concrete, to present a flush outer surface with the surrounding surface S after installation, as illustrated in FIG. 4. The face plate 48 includes an internally threaded closure section 52 and a depending annular rim section 50 which seats the gasket 18. The threads of the section 52 mate with male threads 44 on the locking collar 40 when the collar is screwed into the plate 48. In addition to the face plate 48, the floor box unit includes a cylindrical housing section 54 which is embedded beneath the floor level S in the underlying material, which is typically concrete. Bolts 56 are employed to join both sections 54 and 57 together. The face plate 48 is affixed to the housing 54 by any suitable means, such as machine screws 59, FIG. 4, and a circular sealing disk 60 of suitable material, such as rubber, is positioned therebetween. A cover plate (not shown) having threads similar to those of the locking collar 40 is normally utilized to protect the receptacle 20 from dirt and moisture when the floor box 14 is not in use.

In use the standing box unit 10 mounting the wiring device 22 with the prongs extending from the flange 30 and the collar 40 may be detachably joined to the floor box 14 and electrically connects the receptacles 24 with the circuitry of the receptacle 20. The housing 10 is grasped to insert the electrical wiring device 22 into the mating device 20 since the device 22 is an integral part of the unit 10. The housing 10 may also be used to rotate and effect any necessary locking action between the contacts of a plug type of wiring device and its receptacle. With the male threads 44 on the locking collar 40 properly engaged with the female threads 52 in the face plate 48, the collar 40 is tightened down until the gasket 18 is forcibly compressed into its seat 50 by the peripheral flange on the stem 28. Because the peripheral flange 30 shields the gasket 18 from the turning motion of the locking collar 40, the gasket 18 encounters only compression and no appreciable torsional stresses are applied to the gasket. Elimination of torsional stresses in the gasket 18 results in more uniformly applied compressive sealing forces around the seat 50 and much less torsional stressing for improved gasket life. The above described procedure is performed in reverse order to disconnect the standing box 10 from the floor box 14. By manually gripping the casing 26, the wiring device fixedly secured to the casing 26 may be readily withdrawn from its mating device in the floor box.

Although FIGS. 1–3 show the electrical fixtures 12 to be aligned in the standing box 10 horizontally across the floor, it should be understood without further discussion that the head 26 could easily be arranged on the standing box 10 to align the electrical fixtures 12 vertically from the floor. Furthermore, in this embodiment, the locking collar 40 is disposed under the head 26 within the vertical projection thereof and must be rotatably tightened into the face plate 48 when the standing box is joined to the floor box 14. Therefore, the head 26 is disposed at a sufficient distance above the peripheral flange 30 to provide access for turning the locking collar 40. Of course, the magnitude of this distance will depend on many factors such as whether the locking collar 40 is turned manually or with a wrench.

Figure 5:
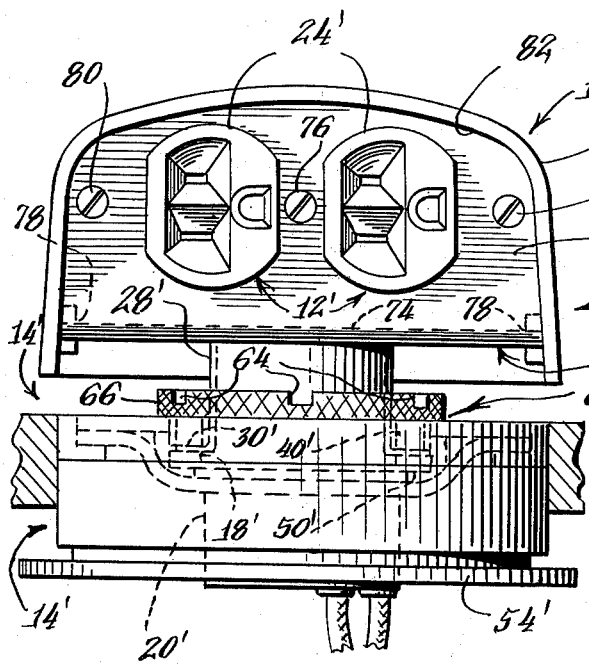
FIG. 5 is a front elevational view depicting another embodiment of a standing box of this invention wherein convenience outlets on the standing box unit are recess-mounted.
Figure 6:
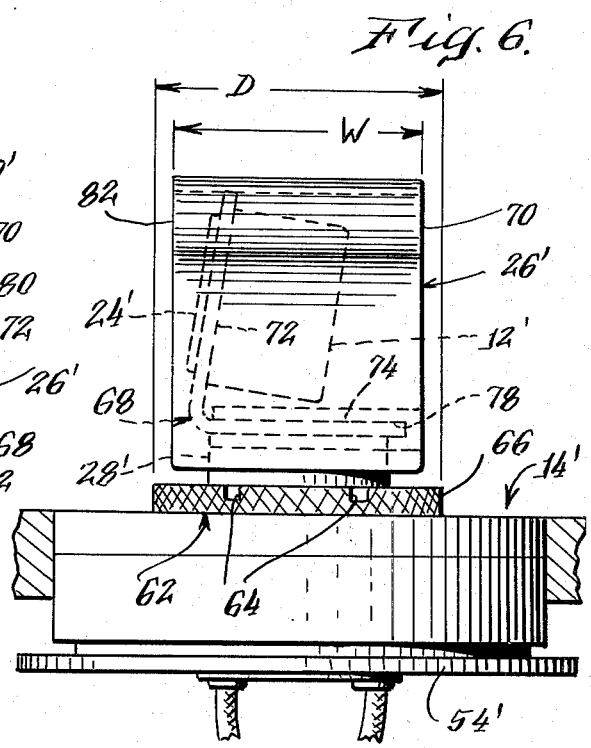
FIG. 6 is a side elevational view of FIG. 5.

In many applications it is desirable that the standing box presents a low profile above the floor and another embodiment of this invention provides such a profile, as is illustrated in FIGS. 5 and 6. The standing box 10' of this embodiment generally includes the same structural elements as were discussed above for the standing box 10 of FIGS. 1–3 and such elements are identified in FIGS. 5 and 6 with the same reference numerals as those used in FIGS. 1–3, but with a prime (') added. A shoulder 62 is peripherally disposed about the locking collar 40' adjacent to the male threads 44' in a direction along the vertical axis of the standing box 10'. The head 26' has a width dimension "W" perpendicular to the longitudinal axis of the head and the collar 40' has an external diameter "D". The diameter D may be smaller, equal to or larger than the width "W". Radial slots 64 are provided to facilitate turning, as by a tool or hand, of the stem. The collar may also be knurled as indicated at 66 to facilitate hand lightening.

As illustrated for this embodiment, the head 26' may be structured from a generally L-shaped mounting shoe 68 and a sliding cover 70 to provide convenient accesibility to the electrical fixture 12' both externally and internally on the standing box 10'. The mounting shoe 68 includes a wall 72 inclined to the vertical axis and a horizontal wall 74, with the latter being affixed to the stem 28' while the duplex convenience outlets 12' are mounted on the former by a screw 76 passing therethrough. The wall 72 is disposed at acute angles to both the vertical axis and the horizontal wall 74 and therefore renders the electrical fixture 12' more accesible from above the floor level. On the sliding cover 70, suitable means for interfitting with the mounting shoe 68 is disposed, such as a groove 78 which is engaged by the engaged by the edge of the horizontal wall 74. Any suitable means for detachably affixing the sliding cover 70 to the mounting shoe 68 may be utilized, such as screws 80 passing through the wall 72 into threaded bosses (not shown) within the sliding cover 70 presents a lip portion 82 which extends outwardly of the upper surface of the wall 72 to reduce the external exposure of the convenience outlets 12'.

It should be understood that the present disclosure has been made by way of example and that numerous changes in the details of construction and the combination or arrangement of parts may be resorted to without departing from the true spirit and the scope of this invention. Therefore, the present disclosure should be construed as illustrative rather than limiting.

We claim:

1. The combination of a standing box unit and a floor box unit and gasket means for sealing both units when the units are connected together, the standing box unit comprising:

a housing mounting at least one electrical convenience outlet thereon;

an electrical plug having a plurality of electrically conductive prongs extending therefrom;

a hollow stem joined at a first end to the underside of said housing and having a second, open end for housing the plug;

a circular flange at the second end of said stem extending radially outwardly therefrom and having an outer diameter substantially equal to that of the gasket;

a passageway common to said first end of said stem and the interior of said housing for allowing passage of wiring connections between the convenience outlet and the plug and insulated wires for electrically connecting said outlet to said plug;

the underside of said housing including a plurality of openings disposed outwardly of said passageway but encompassed within said stem, a plurality of plug-retaining elements passing axially into said stem through said openings;

said plug including a plurality of openings axially aligned with the openings in said housing in which said retaining elements are secured, whereby the plug is affixed in said stem to said housing with the prongs of the plug extending along said axis and projecting beyond said flange of said stem;

an externally-threaded collar loosely mounted on said stem between the underside of the standing box and said flange, said collar having an internal diameter less than the external diameter of said flange;

the floor box unit including an outwardly-facing receptacle mounted fixedly below the surface of a floor in which the floor box unit is mounted;

a flat floor plate mounted fixedly to the floor box unit substantially flush with said surface, said floor plate having an internally threaded portion adjacent the upper surface thereof and an annular shoulder portion inwardly of said threaded portion;

said shoulder portion supporting the gasket thereon;

the external threads of said collar mating with the internal threads of said floor plate;

means disposed on a portion of the surface of said collar which projects above the floor surface for facilitating rotation of said collar into said floor plate, whereby rotation of said collar drives said flange axially to compress the gasket with minimum torsional stresses against said shoulder portion of said floor plate and thereby effect a sealed, threaded mounting of the standing box unit to the floor box unit.

2. The combination as claimed in claim 1 wherein said means on the collar surface comprises a pin mounted substantially parallel to the axis of said stem.

3. The combination as claimed in claim 1 wherein said means on the collar surface comprises at least one groove extending radially from the stem axis.

* * * * *